Patented May 6, 1930

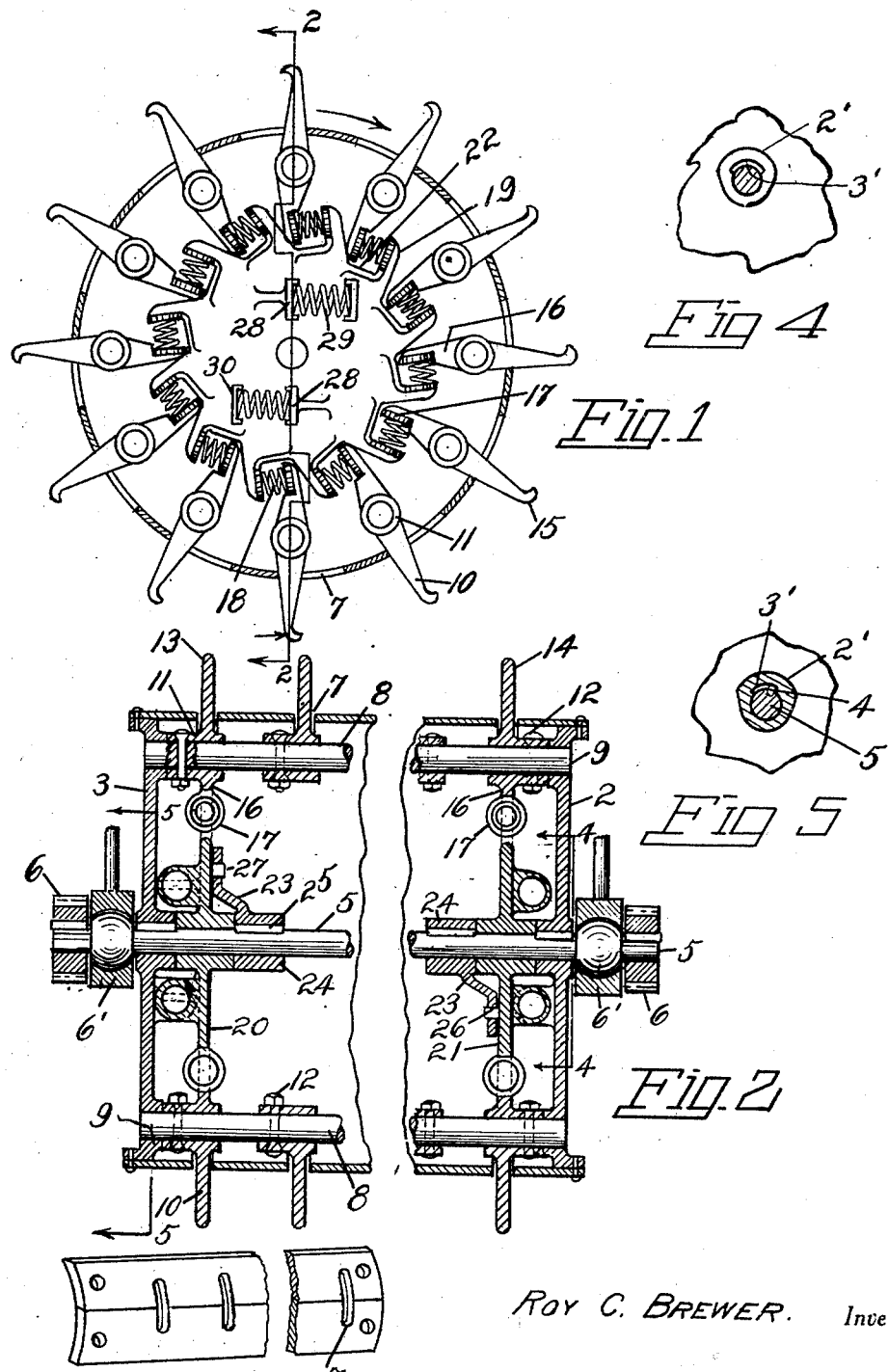

1,757,511

UNITED STATES PATENT OFFICE

ROY C. BREWER, OF BLACKFALDS, ALBERTA, CANADA

CULTIVATOR REEL

Application filed March 12, 1928. Serial No. 261,122.

My invention relates to implements in cultivator reels for agricultural implements of the rotary type, employing pivoted teeth for cultivating the ground. The primary object of the invention is the provision of means for mounting the teeth on the rotary reel or drum in such manner that the teeth on the reel or drum may adapt themselves to irregularities or obstructions in the ground. In carrying out my invention I utilize resilient means between the pivoted teeth and the rotary drum which carries the teeth whereby compensation is made for obstructions encountered, in order to prevent breaking of the teeth or other parts of the implement.

In the accompanying drawings I have illustrated one complete example of the physical embodiment of my invention wherein the parts are combined and arranged according to the best mode I have so far devised for the practical application of the principles of my invention.

Figure 1 is the transverse sectional view through a rotary drum as at line 1—1 of Fig. 2.

Fig. 2 is a broken longitudinal sectional view of the drum as at line 2—2 of Fig. 1.

Fig. 3 is a perspective view showing a portion of the drum indicating the arcuate slots therein.

Fig. 4 is a detail view showing the hub of one of the drum heads.

Fig. 5 is a detail section at line 5—5 of Fig. 2.

In carrying out my invention I utilize a rotary reel or drum which may be fashioned from slats as indicated in Fig. 3, and this drum, which is of cylindrical shape, is provided with two spaced circular heads 2 and 3 that are formed with hubs 2' having inner arcuate grooves 3' to receive the keys 4 of the shaft 5 and permit slight relative movement of the heads and shaft. The shaft is driven in the direction of the arrow in Fig. 1 so that the rotary drum will turn clockwise, as the wheeled cultivator advances. The rotary drum forms part of a wheeled implement which may be power operated or which may be operated by tractor wheels, and the power is applied to the shaft 5 through pinions 6 on the shaft. The shaft 5 is journaled in suitable bearings 6' of the implement, and power is transmitted to the pinions 6 in any suitable manner.

The drum is fashioned with a number of series of arcuate slots 7, and the slots are spaced longitudinally of the drum as indicated in Fig. 3.

Within the drum are journaled a number of rockshafts 8 which are spaced at regular intervals and which extend longitudinally of the drum with bearings 9 in the opposite ends or heads of the drum. These rockshafts are designed to rock in their bearings, and they carry the cultivator teeth 10. The teeth are fashioned with hubs 11 and transversely extending bolts 12 secure the teeth to the rockshafts so that the teeth project radially from the interior of the drum through the slots 7 to the exterior thereof as indicated in Fig. 1. The two annular end series of teeth are indicated as 13 and 14, and these teeth are provided with hubs and bolts by means of which they are rigidly secured to the rockshafts, similar to teeth 10. The ends of all of the teeth are rounded as at 15 and they project through the slots 7 and are resiliently supported in such manner that as the drum rotates or revolves, should the teeth encounter obstructions, the teeth "give" or are moved to avoid breaking.

To provide a resilient support for all of the teeth so that they may "give" when they encounter an obstruction, I provide the two series of teeth 13 and 14 with inwardly extending lever arms 16 which are fashioned at their inner ends with heads 17. Springs 18 are interposed between these heads 17 and bracket plates 19 on the pair of disks 20 and 21. These disks are each fashioned with a series of peripheral notches 22 and the plates 19 form walls of the notches disposed approximately in the same plane as the bracket heads of the lever arms. The disks may be keyed to shaft 5, or carried by the pin 27 in the arm 23, the latter being keyed to shaft 5. It will be apparent in Fig. 1 that when resistance is offered to the lowermost tooth, pressure on the outer free end of the tooth will cause the lever arm to compress the spring 18; thus giving resilience or elasticity to the movement of the tooth and permitting it to give and adapt itself to the pressure applied to it.

In addition to springs 18 for receiving the shocks or strains imparted to the teeth, resilient means are utilized between the rocking disks and the drum for absorbing shocks. For this purpose, the disks which rotate with the drum, are also permitted to have such movement relative thereto. Thus each disk is provided with a drive arm 23 having a hub 24 that is keyed at 25 to the shaft 5. This drive arm has a hole 26 to receive a pin 27, which pin is secured to the disk 20 or 21. Each of the disks on its face adjoining the head of the cylinder is provided with a pair of brackets 28 arranged diametrically about the shaft 5 and springs 29 are interposed between these brackets and complementary brackets 30 on the inner face of the cylinder heads 2 and 3.

Thus, it will be apparent that each set of teeth carried by a rock bar is provided with a pair of resilient springs 18 to compensate for slight strains imposed thereon, and in addition all of the teeth and rock shafts through the disks 20 and 21 have the springs 29 to absorb and compensate for greater shocks or strains imparted to the teeth.

If the agricultural implement or cultivator is passing over rough, stony ground, the teeth will adapt themselves readily to the irregularities or obstructions and be permitted to pass freely thereover without danger of breaking any of the parts, after which the teeth are immediately restored to normal operative position by the springs, as soon as the strain has been removed from the teeth.

Having thus fully described my invention what I claim as new and desire to secure by Letters Patent is:—

1. The combination with a rotary drum having longitudinal rows of arcuate slots and a rigid main shaft, of an annular series of parallel rock shafts about the main shaft and journaled in the drum, spaced teeth fixed to the rock shafts and protruding through the slots, a pair of relatively movable disks mounted on the main shaft within the drum and means including springs between the teeth and disks for limiting this relative movement, and resilient means between the disks and drum.

2. The combination with a main shaft and a rotary drum having a slot therein and end heads for the drum, of a rock shaft journaled in the heads, a tooth fixed on the rock shaft and protruding through the slot, a lever on the rock shaft, a relatively movable disk carried by the main shaft and means for limiting its relative movement, a spring between the lever arm and said disk, and a spring between a head and said disk.

3. The combination with a main shaft and a rotary drum, said drum having end heads and interior brackets thereon, of a pair of relatively movable disks carried on the shafts and coacting means on the shaft and disks for limiting such movement, brackets on the disks, springs between the drum brackets and the disk brackets, an annular series of rock shafts journaled in the end heads and teeth on said shafts protruding through slots in the drum, levers on the rock shafts, and springs interposed between said levers and the disks.

In testimony whereof I affix my signature.

ROY C. BREWER.